United States Patent
Liu et al.

(10) Patent No.: US 10,278,124 B1
(45) Date of Patent: Apr. 30, 2019

(54) DYNAMIC CELL RANGE EXPANSION

(71) Applicant: Sprint Spectrum L.P., Overland Park, KS (US)

(72) Inventors: Chunmei Liu, Great Falls, VA (US); Yu Zhou, Herndon, VA (US); Daniel Vivanco, Herndon, VA (US); Krishna Sitaram, Chantilly, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 1193 days.

(21) Appl. No.: 14/061,543

(22) Filed: Oct. 23, 2013

(51) Int. Cl.
*H04W 48/20* (2009.01)
*H04W 48/08* (2009.01)
*H04W 36/24* (2009.01)
*H04W 24/10* (2009.01)

(52) U.S. Cl.
CPC .......... *H04W 48/20* (2013.01); *H04W 24/10* (2013.01)

(58) Field of Classification Search
CPC .............................. H04W 48/20; H04W 36/24
USPC .................................... 455/422.1, 404, 452.2
See application file for complete search history.

(56) References Cited

U.S. PATENT DOCUMENTS

| | | | |
|---|---|---|---|
| 2012/0028627 A1 | 2/2012 | Hunzinger | |
| 2012/0113961 A1 | 5/2012 | Krishnamurthy | |
| 2013/0324133 A1* | 12/2013 | Li | H04W 48/16 455/444 |
| 2015/0257092 A1* | 9/2015 | Zhao | H04W 48/20 455/436 |

FOREIGN PATENT DOCUMENTS

WO    WO 2011/116833 A1 *  9/2011

OTHER PUBLICATIONS

Kudo et. al., "Cell range expansion using distributed Q-learning in heterogeneous networks", EURASIP Journal on Wireless Communications and Networking, 2013, 10 pages.

* cited by examiner

*Primary Examiner* — Gary Lafontant

(57) ABSTRACT

Methods and systems are provided for calculating a bias value based on radio frequency signal power measurements. A wireless communication device (WCD) measures the powers of radio frequency signals received by the WCD, including a first radio frequency signal transmitted by a first base station of a wireless network and a second radio frequency signal transmitted by a second base station of the wireless network. The first base station transmits radio frequency signals at a higher power than the second base station. The WCD calculates a bias value based on at least one of the measured powers of the first radio frequency signal and the second radio frequency signal. The bias value, in combination with the measured powers of the first and second radio frequency signals, can be used to select one of the first and second base stations.

12 Claims, 6 Drawing Sheets

DYNAMIC CELL RANGE EXPANSION

BACKGROUND

Many people use wireless communication devices (WCDs), such as cell phones and personal digital assistants (PDAs), to communicate with cellular wireless networks. These WCDs typically communicate over a radio frequency (RF) air interface with a wireless network. Wireless networks typically include a plurality of base stations, each of which provide one or more wireless coverage areas, such as cells and sectors. When a WCD is positioned in one of these wireless coverage areas, it can communicate over the air interface with the base station, and in turn over one or more circuit-switched networks, packet-switched networks, and/ or other transport networks to which the base station provides access.

Some base stations in cellular wireless networks may be located in publicly-accessible areas and may be usable by a service provider's customers generally. Such base stations are often referred to as providing wireless coverage in "macrocells."

Other base stations in cellular wireless networks may transmit at lower power levels so to provide wireless coverage in smaller areas, such as "picocells" or "femtocells." Such base stations may be located in private locations, such as residential or business locations, and/or may be usable by only particular customers. As one example, service providers have recently begun offering consumers devices referred to herein as Low-Cost Internet Base Stations (LCIBs), which may provide femtocell wireless coverage and use a customer's Internet connection as backhaul.

The wireless coverage provided by a low-power base station with a femtocell or picocell coverage area (e.g., an LCIB) may overlap or be encompassed within a macrocell. In such cases, it may be possible for a WCD to receive wireless service from either the macrocell base station or from the low-power base station.

OVERVIEW

Methods and systems are provided for calculating bias values based on radio frequency signal power measurements. In some embodiments, a wireless communication device (WCD) measures the powers of radio frequency signals received by the WCD, including a first radio frequency signal transmitted by a first base station of a wireless network and a second radio frequency signal transmitted by a second base station of the wireless network. The first base station transmits radio frequency signals at a higher power than the second base station. The WCD calculates a bias value based on at least one of the measured powers of the first radio frequency signal and the second radio frequency signal. The WCD selects a base station from among the first base station and the second base station based on at least the measured power of the first radio frequency signal received from the first base station, the measured power of the radio frequency signal received from the second base station, and the bias value. The WCD transmits one or more messages to the selected base station requesting a connection to the wireless network through the selected base station.

In some embodiments, a WCD measures the powers of radio frequency signals received by the WCD, including a first radio frequency signal transmitted by a first base station of a wireless network and a second radio frequency signal transmitted by a second base station of the wireless network. The first base station transmits radio frequency signals at a higher power than the second base station. The WCD calculates a bias value based on at least one of the measured powers of the first radio frequency signal and the second radio frequency signal. The WCD generates a first report indicative of the measured power of one of the first and second radio frequency signals and a second report indicative of the measured power of the other of the first and second radio frequency signals offset by the bias value. The WCD transmits the first and second reports to the wireless network.

In some embodiments, a WCD includes a radio frequency transceiver, a processor, and data storage that stores program instructions. The program instructions are executable by the processor to cause the WCD to perform functions. The functions include: (i) measuring powers of radio frequency signals received by the radio frequency transceiver, including at least a first radio frequency signal transmitted by a first base station of a wireless network and a second radio frequency transmitted by a second base station of the wireless network, wherein the first base station transmits radio frequency signals at a higher power than the second base station and (ii) calculating a bias value based on at least one of the measured powers of the first radio frequency signal and second radio frequency signal.

These as well as other aspects and advantages will become apparent to those of ordinary skill in the art by reading the following detailed description, with reference where appropriate to the accompanying drawings.

DETAILED DESCRIPTION

1. Introduction

Figure 1A:
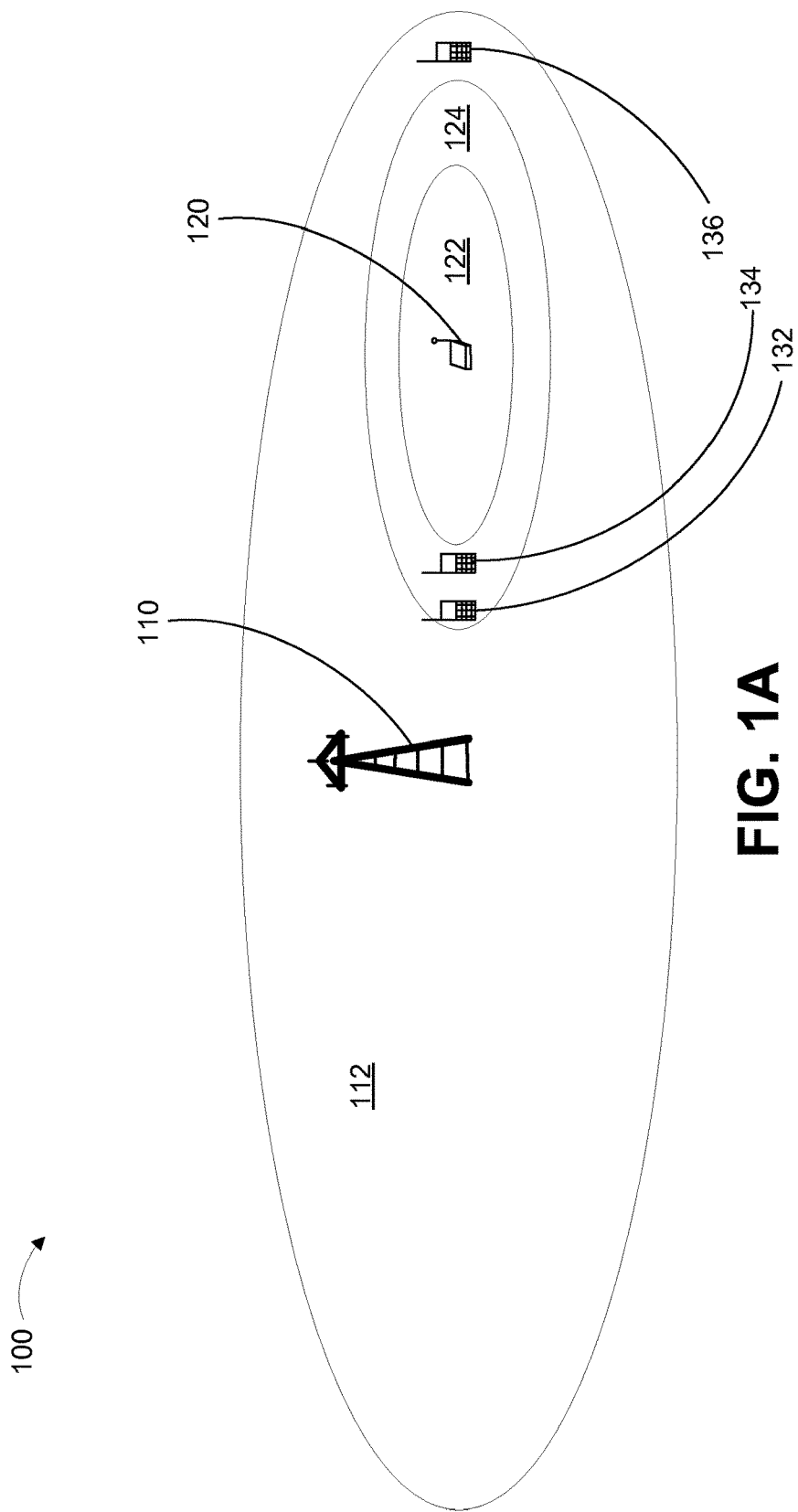
FIG. 1A is a simplified diagram of elements of a wireless network and cells associated with the wireless network, in accordance with an example embodiment.

A wireless network can include a plurality of base stations that allow wireless communication devices (WCDs) to communicate with the wireless network. In some examples, a WCD is served by an individual base station at a time, and can be handed off between base stations. It can be desirable for a WCD that is being served by a first base station to be handed off to a second base station to avoid disruption of wireless communications between the WCD and the wireless network. For example, the WCD can be a cellphone that is being served by a base station and that is traveling in a moving vehicle. As the cellphone moves in the vehicle, its distance from the first base station increases, and its distance from a second base station decreases. The ability of the WCD and the base stations to wirelessly communicate generally decreases with increasing distance, so it can be desirable to handoff the WCD from the first base station to the second at some point in time to maintain the connection between the WCD and the wireless network. The determination that the WCD could be handed off from one base station to another can be made based on at least the measured power of radio frequency signals transmitted by the base stations and received by the WCD. In an example, a WCD being served by a first base station measures the power of radio frequency signals from the first base station and a second base station. If the measured power of the signal from the second base station is greater than the measured power of the signal from the first base station, the WCD may be handed off to the second base station, so that the second base station begins serving the WCD.

Other factors could influence the determination that a WCD could be handed off. In an example, the first base station could provide wireless coverage in a macrocell, and the second base station could be a lower-power base station, such as a low-cost internet base station (LCIB), that provides coverage in a femtocell or picocell. The WCD may measure the powers of radio frequency signals from both the first and second base stations. The first base station could be serving the WCD, as well as many other devices. Because of the load on the first base station, it may be desirable to handoff the WCD to the second base station, even if the measured power of the radio frequency signal received from the second base station is less than the measured power of the radio frequency signal received from the first base station. This consideration could be implemented by offsetting the measured power of the second base station with a bias value. By offsetting the measured power of the radio frequency signal received from the second base station by a bias value, the WCD might be handed off to the second base station even if the measured power of the radio frequency signals from the second base station was less than the measured power of the radio frequency signals from the first base station, provided that the measured power corresponding to the second base station was less than the measured power corresponding to the first base station by an amount less than the amount of the bias value.

The use of a bias value to affect a determination that a WCD could be handed off from one base station to another base station could result in a WCD handoff which causes an increase in interference in the wireless communications between the WCD and the wireless network. For example, a WCD could be served by a first base station and be able to measure power levels of radio frequency signals from the first base station and a second base station. A bias value could be applied to the measured power corresponding to the second base station, resulting in a handoff of the WCD from the first base station to the second base station. However, the first base station may be transmitting high-power radio frequency signals which could interfere with wireless communications between the WCD and the second base station. In another example, a WCD is served by a first base station and is able to measure power levels of radio frequency signals from the first base station and a second base station, and the measured power level corresponding to the first base station is greater than the measured power level corresponding to the second base station even after the application of a bias value. As a result, the WCD continues to be served by the first base station. However, the radio frequency signals received from the second base station could have a high quality (e.g., they could be relatively free of interference from the radio frequency signals transmitted by the first base station), such that wireless communication between the WCD and the second base station would be acceptable.

To take interference levels into account, a bias value can be based on one or more measured power levels of radio frequency signals received by a WCD. In an example, when making a determination whether to handoff a WCD from a first base station to a second base station that transmits radio frequency signals at a lower power than the first base station, the bias value could be based on a measured power level of the radio frequency signals received by the WCD from the first base station. The bias value could be calculated as the output of a function whose output decreases monotonically with an input measured power level of the radio frequency signals from the first base station. The input measured power level of the first base station could be a reference signal received power (RSRP) of the received signal from the first base station or some other measure of the power level of the received radio frequency signal from the first base station. The monotonically decreasing function could be a linear function or a non-linear function; example non-linear functions could include exponentials, polynomials, piecewise defined functions, lookup tables, rational functions, or any other non-linear functions which could map an input measured power level of a base station to an output bias value such that the output bias value decreases monotonically with increasing input measured power levels.

In another example, when making a determination that a WCD should be handed off between a first base station and a second base station that transmits radio frequency signals at a lower power than the first base station, the bias value could be based on a signal quality level of the radio frequency signals received by the WCD from the second base station. The bias value could be calculated as the output of a function whose output increases monotonically with an input signal quality level of the radio frequency signals from the second base station. The input signal quality level of the first base station could be a reference signal received quality (RSRQ) calculated based on the received signal from the second base station and a received signal strength indicator (RSSI) that accounts for received signals from any other sources which could interfere with the received signal from the second base station. The monotonically increasing function could be a linear function or a non-linear function; example non-linear functions could include exponentials, polynomials, piecewise defined functions, lookup tables, rational functions, or any other non-linear functions which could map an input calculated quality level of a base station to an output bias value such that the output bias value increases monotonically with increasing input quality levels. The bias value may be based on the output of multiple functions; for example, it could be a weighted sum of the output of a monotonically decreasing function of an input measured power level of radio frequency signals received from a first base station and the output of a monotonically increasing function of an input calculated quality of radio frequency signals received from a second base station. The weighted sum could also include other factors; for example, it could include a constant offset term that could be based on the load of one or more of the base stations transmitting radio frequency signals received by the WCD.

It is evident to one skilled in the art that the need to handoff a WCD between a first base station and a second base station could arise in a variety of scenarios in addition to the examples related above. The WCD could take the form of a cellphone, a mobile hotspot, a tablet computer, a laptop computer, a personal computer, a wireless-enabled appliance, or any device that is configured to access a wireless network. The base stations could be macro base stations, micro base stations, pico base stations, femto base stations, low-cost internet base stations, other base stations configured to serve a WCD and enable wireless communication between the WCD and the wireless network, or any combination of the above. Changes in the power, quality, or other properties of radio frequency signals transmitted by base stations that are received by a WCD could occur due to a variety of factors, including relative motion of the WCD and the base stations, changes in atmospheric conditions, radio frequency noise sources, or any other factors capable of affecting wireless communication between a WCD and a base station. A WCD may be able to measure powers of received radio frequency signals from more than two base stations. The WCD may calculate a bias value by using measured power levels relating to a base station of the more than two base stations corresponding to the highest measured power level and measured power levels relating to a base station of the more than two base stations which is a femtocell or LCIB which is configured to be able to serve the WCD. Bias values could be calculated for comparison of more than one pair of base stations; for example, a bias values could be calculated for each pairwise combination of base stations in the set of base stations whose transmitted radio frequency signals the WCD can receive.

A WCD may not be served by any base station at all; for example, a WCD may not be served by a base station immediately after being powered on or after exiting a mode in which communication features or components of the WCD are disabled. In such example scenarios, the methods described herein could be used to select a base station to serve the WCD, where the selected base station is one of a set of base stations which could serve the WCD. For example, a WCD could be activated and could detect radio frequency signals from a first base station and a second base station, where the first base station transmits radio frequency signals at a higher power than the second base station. The decision to serve the WCD with the first or the second base station could be made based on a measured power of the radio frequency signal from the first base station that is received by the WCD, a measured power of the radio frequency signal from the second base station that is received by the WCD, and a bias value based on the measured powers of the radio frequency signals from the first and the second base stations that are received by the WCD. The decision could be made by the WCD and the WCD could transmit a message to the wireless network to request that the WCD be served by the selected base station. Alternatively, the WCD could send messages containing one or more of the measured power of the radio frequency signal from the first base station that is received by the WCD, the measured power of the radio frequency signal from the second base station that is received by the WCD, and the bias value based on the measured powers of the radio frequency signals from the first and the second base stations that are received by the WCD to the wireless network. The wireless network could then use the contents of the messages sent by the WCD to select a base station to serve the WCD.

2. Example Wireless Network

As shown in FIG. 1A, an example wireless network 100 may include a macro base station 110, a femtocell low-cost internet base station (LCIB) 120, and several wireless communication devices (WCDs) 132, 134, 136. Additional entities could be present, such as additional WCDs, additional LCIBs, micro base stations, additional macro base stations, pico base stations, etc. The illustrated example elements are part of a wireless network which facilitates communication between WCDs, between WCDs and other networks (e.g., the internet, a public switched telephone network (PSTN), etc.). Example wireless coverage area 112 (which includes areas 122 and 124) is an example of an area in which a WCD could be served by the macro base station 110. WCDs 132, 134, 136 are able to be served by either the macro base station 110 or the LCIB 120. The WCDs 132, 134, 136 are configured to measure powers of radio frequency signals they receive from base stations (e.g., macro base station 110 and LCIB 120).

The measured powers can be used to determine whether to handoff a WCD (e.g., 132) from one base station to another. This determination can be made to avoid disruption of wireless communication between the WCD 132 and the wireless network 100. An example determination could be to compare the measured power of the radio frequency signals from the macro base station 110 to the measured power of the radio frequency signals from the LCIB 120 and handoff the WCD (e.g., 134) to whichever of the macro base station 110 and LCIB 120 corresponds to the greater measured power. Area 122 is an example of an area in which a WCD could measure a greater power corresponding to LCIB 120 and could be served by LCIB 120.

In some embodiments, it could be advantageous to handoff a WCD (e.g., 134) to LCIB 120 from macro base station 110 to reduce the load on macro base station 110. To make the determination to handoff the WCD 134, the measured power of the radio frequency signals from the macro base station 110 could be compared with the measured power of the radio frequency signals from the LCIB 120 offset by a constant bias value. Area 124 (surrounding area 122) is an example of an area in which a WCD could measure a greater power corresponding to macro base station 110 but the determination could be made to serve WCD 134 by LCIB 120, where the determination is based on the measured power of the radio frequency signals from the macro base station 110 and the measured power of the radio frequency signals from the LCIB 120 offset by the constant bias value.

In some instances, the use of a constant bias value in the determination to handoff a WCD could lead to disruption of wireless communications between the WCD and the wireless network. In one example, WCD 132 is in area 124 and is being served by LCIB 120. However, the radio frequency signals received by the WCD 132 from macro base station 110 could be sufficiently powerful that they interfere with communication between WCD 132 and LCIB 120. In another example, WCD 136 is being served by macro base station 110. The measured power of the radio frequency signals transmitted by macro base station 110 and received by WCD 136 could be greater than the measured power of the radio frequency signals transmitted by LCIB 120 and received by WCD 136 offset by a constant bias. However, the quality of the radio signals transmitted by LCIB 120 and received by WCD 136 could be such that communication between the WCD 136 and wireless network 100 could be acceptable.

Figure 1B:
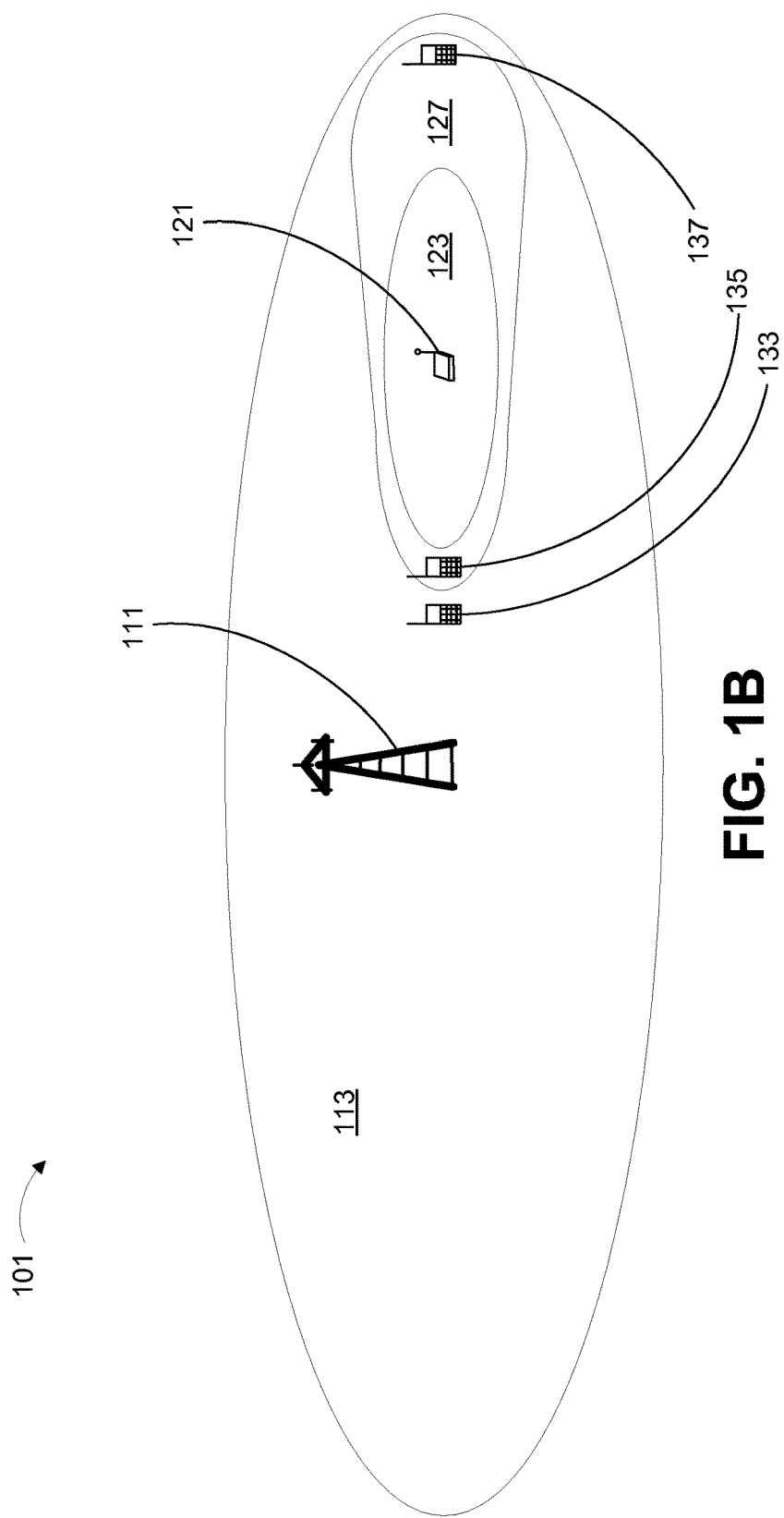
FIG. 1B is a simplified diagram of elements of a wireless network and cells associated with the wireless network, in accordance with an example embodiment.

FIG. 1B shows an example wireless network 101 that includes a macro base station 111, a femtocell low-cost internet base station (LCIB) 121, and several wireless communication devices (WCD) 133, 135, 137. Additional entities could be present, such as additional WCDs, additional macro base stations, additional LCIBs, micro base stations, pico base stations, etc. The illustrated example elements are part of a wireless network which facilitates communication between WCDs, between WCDs and other networks (e.g., the internet, a public switched telephone network (PSTN), etc.). Example wireless coverage area 113 (which includes areas 123 and 127) is an example of an area in which a WCD could be served by the macro base station 111. WCDs 133, 135, 137 are able to be served by either the macro base station 111 or the LCIB 121. The WCDs 133, 135, 137 are configured to measure powers of radio frequency signals they receive from base stations (e.g., macro base station 111, LCIB 121).

In some embodiments, it could be advantageous to make the determination to handoff a WCD (e.g., 135) to avoid disruption of wireless communication between the WCD 135 and the wireless network 101. An example determination could be to compare the measured power of the radio frequency signals from the macro base station 111 to the measured power of the radio frequency signals from the LCIB 121 and handoff the WCD (e.g., 135) to whichever of the macro base station 111 and LCIB 121 corresponds to the greater measured power. Area 123 is an example of an area in which a WCD could measure a greater power corresponding to LCIB 121 and could be served by LCIB 121.

In some embodiments, it could be advantageous to handoff a WCD (e.g., 135) to LCIB 121 from macro base station 111 to reduce the load on macro base station 111. To make the determination to handoff the WCD 135, the measured power of the radio frequency signals from the macro base station 111 could be compared with the measured power of the radio frequency signals from the LCIB 121 offset by a bias value that is based on the measured power of the radio frequency signals from the macro base station 111, the measured power of the radio frequency signals from the LCIB 121, or some combination of these measured powers. Area 127 (surrounding area 123) is an example of an area in which a WCD could measure a greater power corresponding to macro base station 111 but the determination could be made to serve WCD 135 by LCIB 121, where the determination is based on the measured power of the radio frequency signals from the macro base station 111 and the measured power of the radio frequency signals from the LCIB 121 offset by a bias value that is based on the measured power of the radio frequency signals from the macro base station 111 and/or the LCIB 121.

Figure 2A:
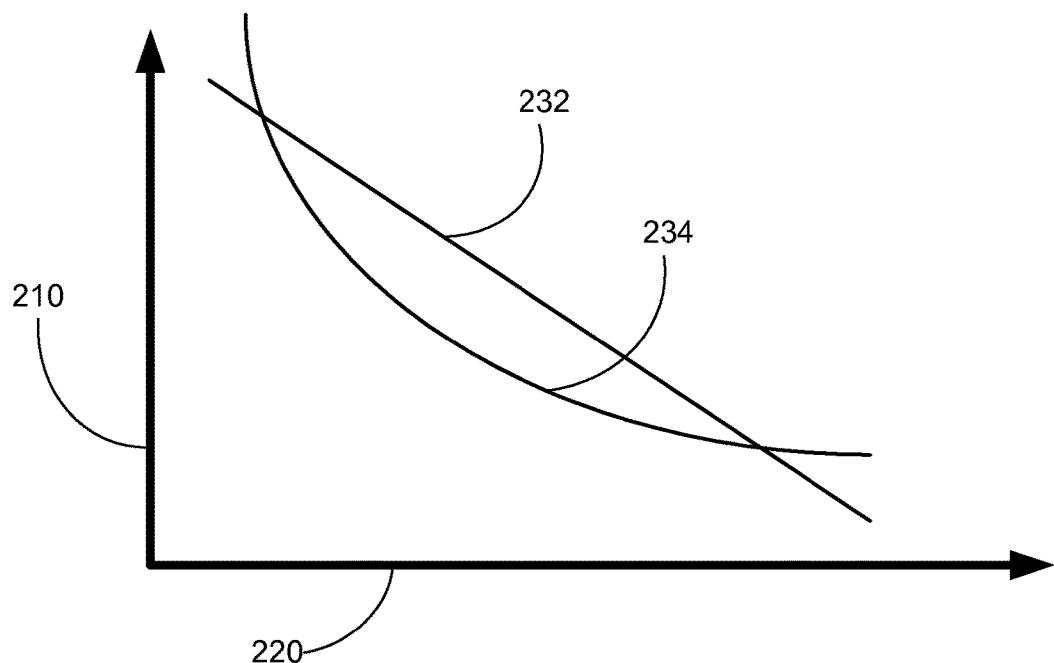
FIG. 2A is an illustration of monotonically decreasing functions which take as an input a measured power of a radio frequency signal and output a bias value, in accordance with an example embodiment.
Figure 2B:
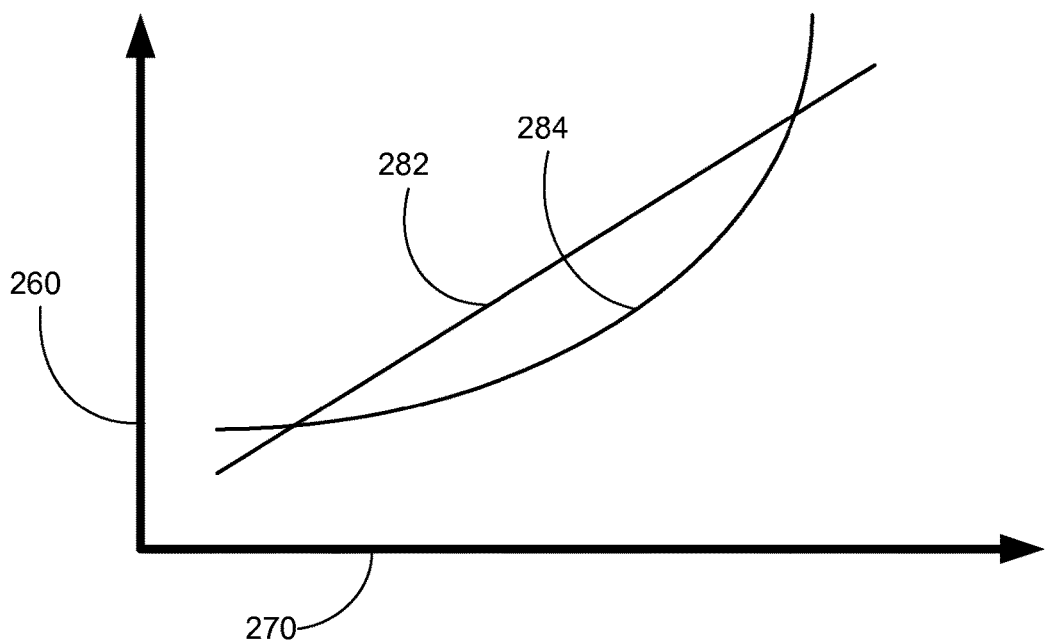
FIG. 2B is an illustration of monotonically increasing functions which take as an input a calculated signal quality of a radio frequency signal and output a bias value, in accordance with an example embodiment.

The bias value can be calculated as the output of a function that takes the measured power of a radio frequency signal received by the WCD as an input. FIG. 2A and FIG. 2B show example functions to take a measured power of a radio frequency signal received by a WCD as an input and calculate an output that can be used as the bias value or from which the bias value can be calculated.

FIG. 2A shows example monotonically decreasing functions 232, 234 which take as input a measured power of a radio frequency signal received by a WCD 220 and generate an output bias value 210. Example monotonically decreasing functions 232, 234 include a linear function 232 and a nonlinear function 234. Example monotonically decreasing functions 232, 234 are intended as illustrative examples of monotonically decreasing functions which take as input a measured power of a radio frequency signal received by a WCD 220 and generate an output bias value 210. In an example, a measured power of a radio frequency signal received by a WCD 220 is a reference signal received power (RSRP) of a macro base station like macro base station 111 of FIG. 1B. The use of a bias value calculated as the output of a monotonically decreasing function of the RSRP of macro base station 111 could result in an area 127 (surrounding area 123) in which a WCD could measure a greater received radio frequency signal power corresponding to macro base station 111 but the determination could be made to serve the WCD by LCIB 121.

An example determination could take the form $p_2+f(p_1) > p_1$, where $p_1$ is an RSRP of macro base station 111, $p_2$ is an RSRP of LCIB 121, and $f(\ )$ is a monotonically decreasing function. This example determination could be made for RSRPs of macro base station 111 and LCIB 121 measured by WCDs 133, 135, and 137. The determination could be true for WCDs 135 and 137; thus, WCDs 135 and 137 could be handed off to LCIB 121. The determination could be false for WCD 133; thus, WCD 133 could continue to be served by macro base station 111.

FIG. 2B shows example monotonically increasing functions 282, 284 which take as input a calculated signal quality of a radio frequency signal received by a WCD 270 and generate an output bias value 260. Example monotonically increasing functions 282, 284 include a linear function 282 and a nonlinear function 284. Example monotonically increasing functions 282, 284 are intended as illustrative examples of monotonically increasing functions which take as input a calculated quality of a radio frequency signal received by a WCD 270 and generate an output bias value 260. In an example, a calculated quality of a radio frequency signal received by a WCD 270 is a reference signal received quality (RSRQ) of an LCIB like LCIB 121 in FIG. 1B. The RSRQ of LCIB 121 could be calculated by dividing a measured power of a radio frequency signal transmitted by LCIB 121 and received by a WCD by an RSSI value measured by the WCD. The use of a bias value calculated as the output of a monotonically increasing function of the RSRQ of LCIB 121 could result in an area 127 (surrounding area 123) in which a WCD could measure a greater radio frequency signal power corresponding to macro base station 111 but the determination could be made to serve the WCD by LCIB 121.

An example determination could take the form $p_2+g(s_2) > p_1$, where $p_1$ is an RSRP of macro base station 111, $p_2$ is an RSRP of LCIB 121, $s_2$ is an RSRQ of LCIB 121, and $g(\ )$ is a monotonically increasing function. This example determination could be made for RSRPs and RSRQs of macro base station 111 and LCIB 121 measured by WCDs 133, 135, and 137. The determination could be true for WCDs 135 and 137; thus, WCDs 135 and 137 could be handed off to LCIB 121. The determination could be false for WCD 133; thus, WCD 133 could continue to be served by macro base station 111.

The examples in FIGS. 1A and 1B described above are meant for purposes of illustration and are not meant to be limiting. The WCD could take the form of a cellphone, a mobile hotspot, a tablet computer, a laptop computer, a personal computer, a wireless-enabled appliance, or any device that is configured to access a wireless network. The base stations could be macro base stations, micro base stations, pico base stations, femto base stations, low-cost internet base stations, other base stations configured to serve a WCD and enable wireless communication between the WCD and the wireless network, or any combination of the above. A WCD may be able to measure powers of received radio frequency signals from more than two base stations (i.e., the illustrated macro base stations 110, 111 and LCIBs 120, 121). The WCD may calculate a bias value by using measured power levels relating to a base station of the more than two base stations corresponding to the highest measured power level and calculated signal quality levels relating to a base station of the more than two base stations which is a femtocell or LCIB which is configured to be able to serve the WCD. Bias values could be calculated for comparison of more than one pair of base stations; for example, a bias value could be calculated for each pairwise combination of base stations in the set of base stations whose transmitted radio frequency signals the WCD can receive. The signal quality may be an RSRQ calculated as described above, or the signal quality could be calculated in another manner to generate a measure of the quality of signals transmitted by a base station and received by a WCD; for example, the signal quality could be a packet loss ratio, a ratio of transmitted signal power to in-band noise signal power, or some other measure of radio frequency signal quality.

The scale of functions 232, 234, 282, 284 is illustrative and not meant to constrain possible functions used in embodiments of the claimed elements. Further, the shape of functions 232, 234, 282, 284 is illustrative; any sort of function could be employed, including a linear function, a non-linear function, an exponential function, a polynomial function, a piecewise defined function, a lookup table, a rational function, or any other non-linear function which could take an input power level or quality level of a radio frequency signal and output a bias value such that the output bias value can be used in the determination to handoff a WCD. The bias value used in determining whether to handoff a WCD could also be based on the outputs of multiple functions. In an example, the bias value used in determining whether to handoff a WCD could be a weighted sum of the output of a monotonically decreasing function of a measured power level of a radio frequency signal received by a WCD and the output of a monotonically increasing function of a calculated quality level of a radio frequency signal received by the WCD.

3. Example Wireless Communication Device

Figure 3:
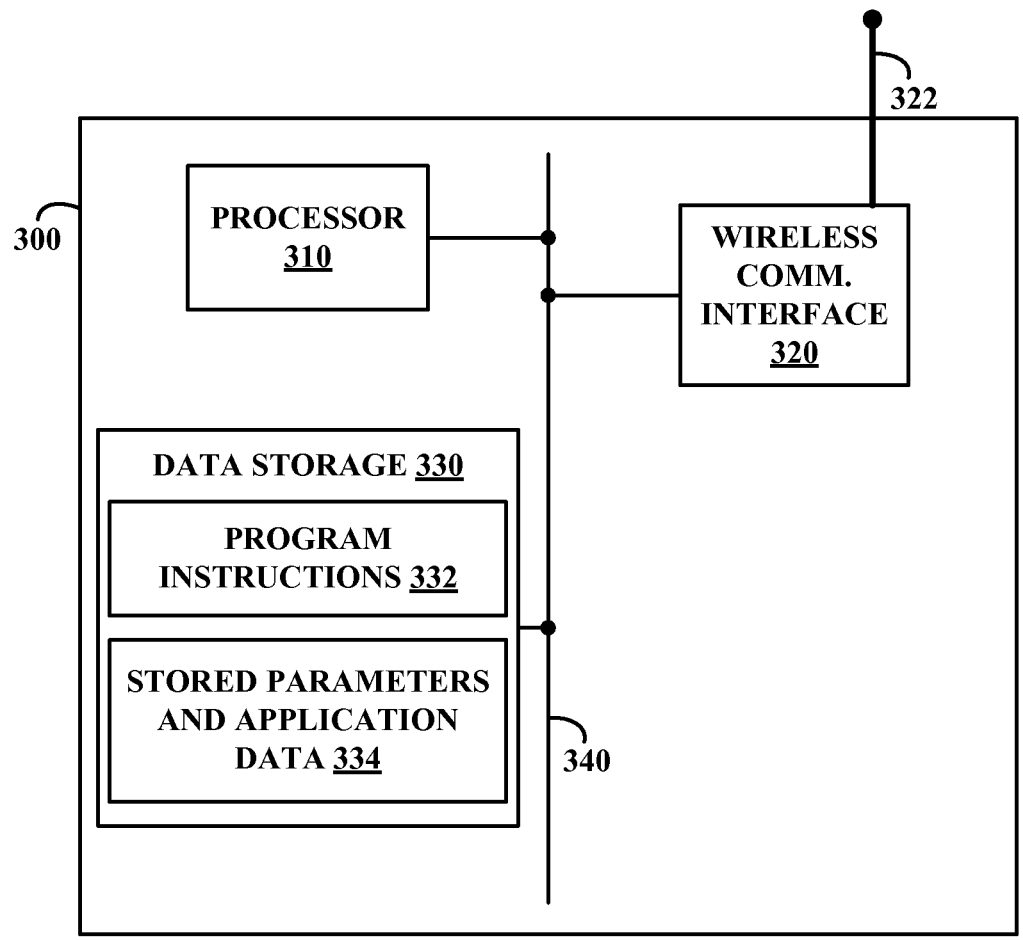
FIG. 3 is a simplified block diagram of a wireless communication device, in accordance with an example embodiment.

FIG. 3 is a simplified block diagram of an example wireless communication device (WCD) that could operate in accordance with any of the methods described in this disclosure. As illustrated, WCD 300 may include a processor 310, a wireless communication interface 320, antenna 322, and data storage 330, all coupled by a system bus 340.

Processor 310 could be, for example, a general purpose microprocessor and/or a discrete signal processor. Though processor 310 is described here as a single processor, those having skill in the art will recognize that WCD 300 may contain multiple (e.g., parallel) processors. Data storage 330 may store a set of program instructions 332 that are executable by processor 310 to carry out one or more of functions described herein. Alternatively, some or all of the functions could instead be implemented through hardware. In addition, data storage 330 may store parameters and application data 334 in connection with carrying out various functions described herein.

Various functions enabled by program instructions 332 contained in data storage 330 can include measuring the powers of radio frequency signals received by the WCD 300 and calculating bias values based on one or more of the measured powers. Calculating a bias value could involve calculating the output of a monotonically decreasing function which takes as an input a measured power level of a radio frequency signal received by the WCD 300. The measured power level of a radio frequency signal received by the WCD 300 could be a reference signal received power (RSRP). The monotonically decreasing function could be a linear function, a non-linear function, or any other function which takes as input a measured power level of a radio frequency signal received by the WCD 300 and outputs a bias value which monotonically decreases with increasing values of the input measured power level. Calculating bias values based on one or more of the measured powers could also include calculating a quality level of a radio frequency signal received by the WCD 300 and calculating the output of a monotonically increasing function which takes as an input the calculated quality level of a radio frequency signal received by the WCD 300. The calculated quality level of a radio frequency signal received by the WCD 300 could be a reference signal received quality (RSRQ). The monotonically increasing function could be a linear function, a non-linear function, or any other function which takes as input a calculated quality level of a radio frequency signal received by the WCD 300 and outputs a bias value which monotonically increases with increasing values of the input calculated quality level. Calculating bias values based on one or more of the measured powers could also include calculating a weighted sum of a plurality of bias values based on the measured powers that are calculated as described above.

Various functions enabled by instructions contained in data storage 330 can further include instructions enabling the selection of a base station and/or transmission of radio frequency signals based on the measured powers of radio frequency signals and the calculated bias values. For example, the WCD 300 could select a base station based on the measured powers of radio frequency signals received by the WCD 300 and the bias values calculated by the WCD 300. The WCD 300 could further transmit to the selected base station a request to be served by the selected base station. In another example, a WCD could generate a report based on the measured powers of radio frequency signals received by the WCD 300 and the bias value calculated by the WCD 300. The WCD 300 could then transmit the generated report to the wireless network. Data storage 330 can further include instructions enabling other operations of the WCD 300, including operation of a user interface, operating sensors included in the WCD, making connections with the PSTN through the wireless network and allowing a user of the WCD 300 to make a telephone call, or other functions of the WCD 300 according to an application of the WCD 300.

Wireless communication interface 320 may include a chipset suitable for communicating with one or more devices over antenna 322. Suitable devices may include, for example, elements of a wireless network. These elements could include macro base stations, micro base stations, pico base stations, femto base stations, low-cost internet base stations (LCIBs), or other suitable devices capable of wireless communication. The chipset could be suitable for communication using Long Term Evolution (LTE) protocols. Alternatively or additionally, the chipset or wireless-communication interface 320 may be able to communicate with other types of networks and devices, such as EV-DO networks, GSM networks, UMTS networks, HSPA networks, WiMAX networks, CDMA networks, Wi-Fi networks, Bluetooth devices, and/or one or more additional types of networks and devices.

WCD 300 can be a stand-alone device, like a cellular telephone, tablet computer, laptop computer, personal computer, or mobile hotspot. If the WCD 300 is a stand-alone device, it can include batteries, recharging circuitry, user interface components, GPS receivers, Bluetooth interfaces, WiFi interfaces, infrared transceivers, displays, accelerometers, and/or other components enabling additional functions of the stand-alone device. Data storage 330 can additionally include program instructions for operating the aforementioned additional components and for enabling the stand-alone function of the WCD 300.

WCD 300 can also be implemented as a component, subassembly, or subsection of another device. For example, WCD 300 could be configured as a MiniPCI card designed to be installed into a portable computer. WCD 300 could also be configured as a PCI card, a PCI-express card, a MiniPCI-express card, a PCMCIA card, a PC card, or to use other interfaces or to comply with other physical formats. WCD 300 could also be implemented to connect via a USB, firewire, ATA, serial, parallel, or other wired or wireless communication method. WCD 300 could be a single integrated circuit chip or several chips and other components assembled onto a printed circuit board or by other means to form a component or sub-assembly. The component or sub-assembly could be configured to be assembled into a device with other components. Said device could be configured to be operated on its own or as a component or sub-assembly of a more extensive device.

4. Example Methods

Figure 4:
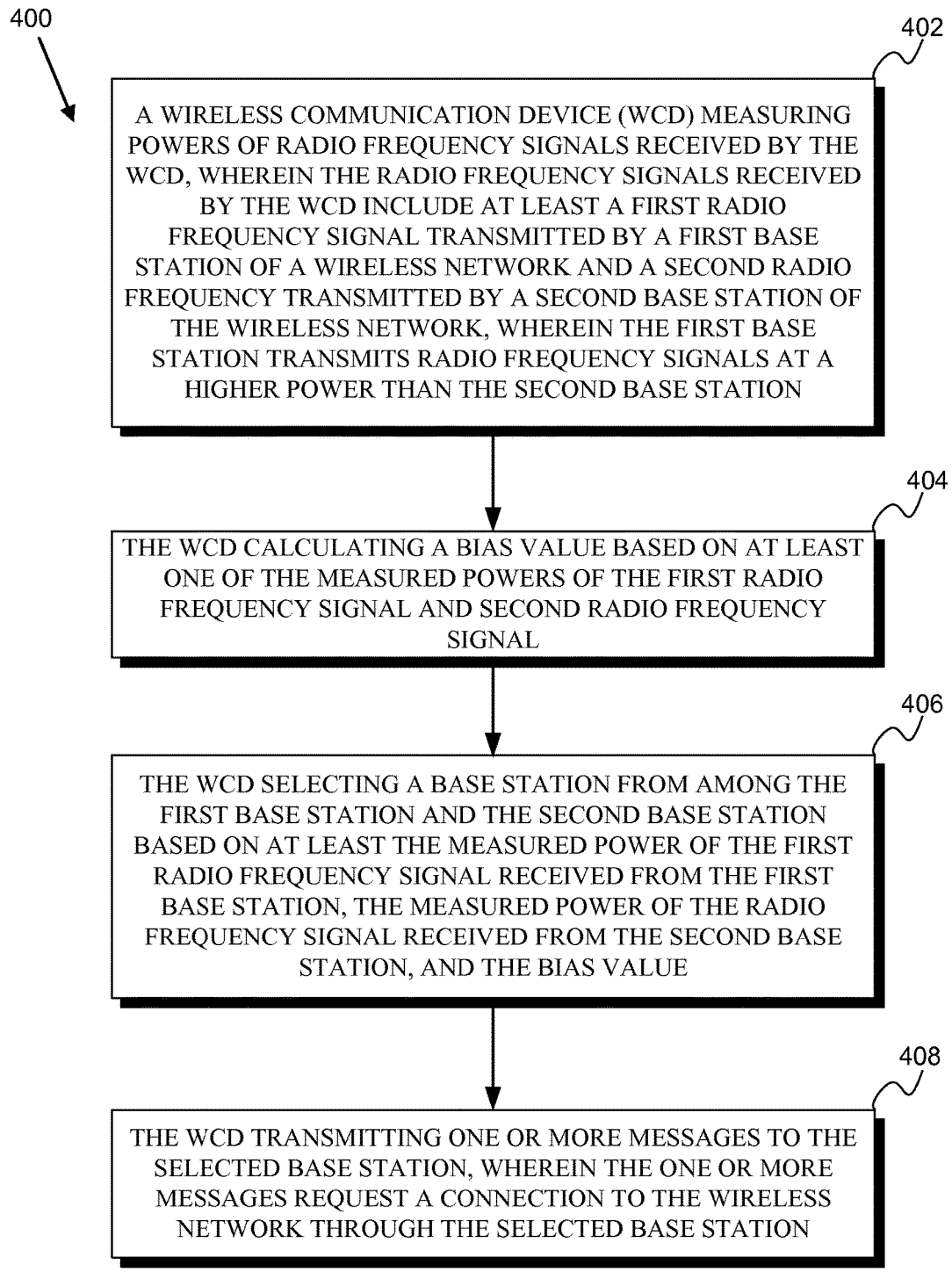
FIG. 4 is a flowchart of a method, in accordance with an example embodiment.

FIG. 4 is a flowchart of an example method 400 carried out by a wireless communication device (WCD), such as the WCD depicted in FIG. 3. As shown in FIG. 4, the method 400 begins at step 402, in which the WCD measures powers of radio frequency signals received by the WCD. The radio frequency signals received by the WCD include at least a first radio frequency signal transmitted by a first base station of a wireless network and a second radio frequency transmitted by a second base station of the wireless network, wherein the first base station transmits radio frequency signals at a higher power than the second base station.

The first and second base stations of the wireless network can be macro base stations, micro base stations, pico base stations, femto base stations, low-cost internet base stations (LCIBs), or any other base station configured to serve the WCD and facilitate communication between the WCD and the wireless network, or any combination of above types of base station. While the first base station transmits radio frequency signals at a higher power than the second base station, the power level of the radio frequency signals transmitted by the first base station and received by the WCD is not necessarily greater than the power level of the radio frequency signals transmitted by the second base station and received by the WCD. Radio frequency signals transmitted by the first and second base stations can be attenuated by a variety of factors, including distance between the base station and the WCD, line-of-sight between the base station and the WCD, buildings or geography in the environment of the base station and the WCD, or any other factor capable of affecting radio frequency signals. The measured powers of radio frequency signals can include measured powers of radio frequency signals transmitted by base stations other than the first and second base stations. In examples where the measured powers of radio frequency signals include measured powers of radio frequency signals transmitted by more than two base stations, the second base station could be an LCIB and the first base station could be a base station of the remaining more than one base station corresponding to the radio frequency signal received by the WCD from the remaining more than one base station with the greatest measured power.

Method 400 also includes step 404, in which the WCD calculates a bias value based on at least one of the measured powers of the first radio frequency signal and second radio frequency signal. In an example, the bias value could be calculated as the output of a monotonically decreasing function of the measured power level of the first radio frequency signal. The measured power level could be a reference signal received power (RSRP) of the first radio frequency signal. The monotonically decreasing function could be a linear function, an exponential function, a polynomial function, a piecewise defined function, a lookup table, a rational function, or any other function which could take an input measured power level of a radio frequency signal and output a bias value such that the output bias value decreases with increasing levels of the input measured power level. The input to the function could be some measure of the power level of the first radio frequency signal than the RSRP. In another example, the bias value could be calculated as the output of a monotonically increasing function of a calculated signal quality level of the second radio frequency signal. The calculated quality level could be a reference signal received quality (RSRQ) of the second radio frequency signal. The RSRQ could be calculated by dividing the measured power level of the second radio frequency signal by an RSSI value measured by the WCD. The monotonically increasing function could be a linear function, an exponential function, a polynomial function, a piecewise defined function, a lookup table, a rational function, or any other function which could take an input quality level of a radio frequency signal and output a bias value such that the output bias value increases with increasing levels of the input quality level. The input to the function could be some other measure of the quality level of the second radio frequency signal than the RSRQ. The calculated quality level could be a packet loss ratio, a ratio of transmitted signal power to in-band noise signal power, or some other measure of radio frequency signal quality. The calculated bias value could be a weighted sum of other calculated bias values, for example a weighted sum of the two example bias values described above. The calculated weighted sum could also include a constant offset related to the load of one or both of the first and second base stations.

Method 400 further includes step 406, the WCD selecting a base station from among the first base station and the second base station based on at least the measured power of the first radio frequency signal received from the first base station, the measured power of the radio frequency signal received from the second base station, and the bias value. In an example, the base station corresponding to the greater of the measured power level of the first radio frequency signal and the measured power level of the second radio frequency signal offset by the calculated bias value is selected. Selection could also include other factors, including whether one of the first and second base stations provides a desired service to the WCD, whether being served by one of the first and second base stations will incur an additional fee, or other factors.

Method 400 additionally includes step 408, the WCD transmitting one or more messages to the selected base station, wherein the one or more messages request a connection to the wireless network through the selected base station. Messages could include identification information corresponding to the WCD, a listing of services requested by the WCD, the power levels measured by the WCD, the power levels measured by the WCD offset by the bias value calculated by the WCD, or other information related to requesting that the base station facilitate a connection between the WCD and the wireless network. The connection requested by the WCD could be an initial connection to the wireless network in the case that the WCD is not already being served by the wireless network. Alternatively, the connection request could be a request to handoff an existing session with the wireless network to the selected base station.

Figure 5:
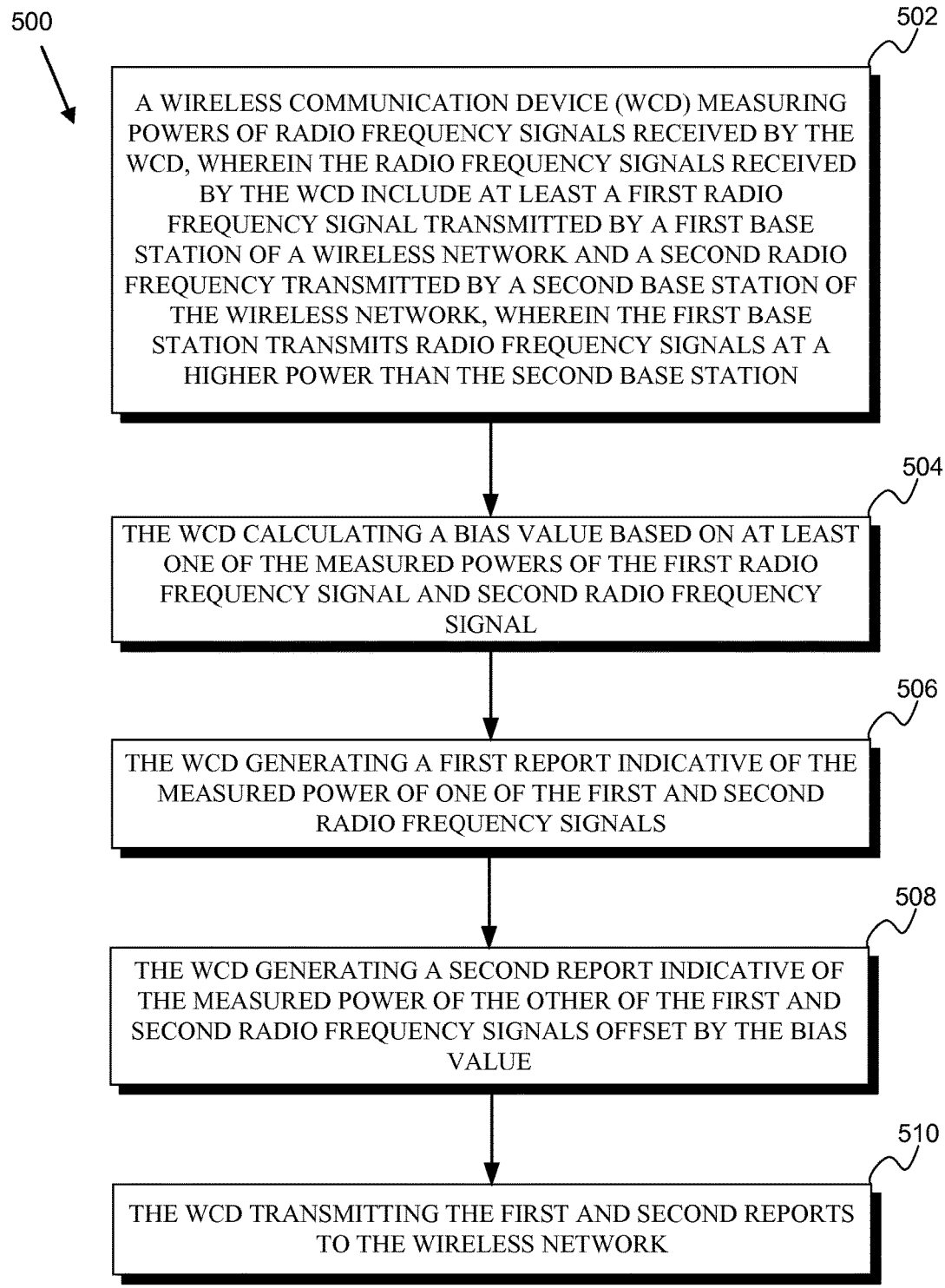
FIG. 5 is a flowchart of a method, in accordance with an example embodiment.

FIG. 5 is a flowchart of an example method 500 carried out by a wireless communication device (WCD), such as the WCD depicted in FIG. 3. As shown in FIG. 5, the method 500 begins at step 502, in which the WCD measures powers of radio frequency signals received by the WCD. The radio frequency signals received by the WCD include at least a first radio frequency signal transmitted by a first base station of a wireless network and a second radio frequency transmitted by a second base station of the wireless network, wherein the first base station transmits radio frequency signals at a higher power than the second base station. The first and second base stations of the wireless network can be macro base stations, micro base stations, pico base stations, femto base stations, low-cost internet base stations (LCIBs), or any other base station configured to serve the WCD and facilitate communication between the WCD and the wireless network, or any combination of above types of base station. While the first base station transmits radio frequency signals at a higher power than the second base station, the power level of the radio frequency signals transmitted by the first base station and received by the WCD is not necessarily greater than the power level of the radio frequency signals transmitted by the second base station and received by the WCD. Radio frequency signals transmitted by the first and second base stations can be attenuated by a variety of factors, including distance between the base station and the WCD, line-of-sight between the base station and the WCD, buildings or geography in the environment of the base station and the WCD, or any other factor capable of affecting radio frequency signals. The measured powers of radio frequency signals can include measured powers of radio frequency signals transmitted by base stations other than the first and second base stations; in examples where the measured powers of radio frequency signals include measured powers of radio frequency signals transmitted by more than two base stations, the second base station could be an LCIB and the first base station could be a base station of the remaining more than one base station corresponding to the radio frequency signal received by the WCD from the remaining more than one base station with the greatest measured power.

Method 500 also includes step 504, in which the WCD calculates a bias value based on at least one of the measured powers of the first radio frequency signal and second radio frequency signal. In an example, the bias value could be calculated as the output of a monotonically decreasing function of the measured power level of the first radio frequency signal. The measured power level could be a reference signal received power (RSRP) of the first radio frequency signal. The monotonically decreasing function could be a linear function, an exponential function, a polynomial function, a piecewise defined function, a lookup table, a rational function, or any other function which could take an input measured power level of a radio frequency signal and output a bias value such that the output bias value decreases with increasing levels of the input measured power level. The input to the function could be some measure of the power level of the first radio frequency signal than the RSRP. In another example, the bias value could be calculated as the output of a monotonically increasing function of a calculated quality level of the second radio frequency signal. The calculated quality level could be a reference signal received quality (RSRQ) of the second radio frequency signal. The RSRQ could be calculated by dividing the measured power level of the second radio frequency signal by the measured power level of noise radio frequency signals in the same frequency band as the second radio frequency signal. The monotonically increasing function could be a linear function, an exponential function, a polynomial function, a piecewise defined function, a lookup table, a rational function, or any other function which could take an input quality level of a radio frequency signal and output a bias value such that the output bias value increases with increasing levels of the input quality level. The input to the function could be some other measure of the quality level of the second radio frequency signal than the RSRQ. The calculated quality level could be a packet loss ratio, a ratio of transmitted signal power to in-band noise signal power, or some other measure of radio frequency signal quality. The calculated bias value could be a weighted sum of other calculated bias values, for example a weighted sum of the two example bias values described above. The calculated weighted sum could also include a constant offset related to the load of one or both of the first and second base stations.

Method 500 additionally includes step 506, the WCD generating a first report indicative of the measured power of one of the first and second radio frequency signals; and step 508, the WCD generating a second report indicative of the measured power of the other of the first and second radio frequency signals offset by the bias value. As an example of steps 506 and 508, the first report could include an RSRP of the first radio frequency signal and the second report could include an RSRP of the second radio frequency signal offset by the calculated bias. In another example, the first report could include an RSRP of the second radio frequency signal and the second report could include an RSRP of the first radio frequency signal offset by the calculated bias. Other measures of the power of the first and second radio frequency signals can be included in the generated reports instead of or in addition to the RSRP of the first and second radio frequency signals.

Method 500 further includes step 508, the WCD transmitting the first and second reports to the wireless network. The first and second reports could be included in the same transmission, or the first and second reports could be included in separate transmissions. The first and second reports could be transmitted by the WCD as part of a regular status transmission or could be transmitted based on a trigger condition, such as a determination that the WCD might be better served by one of the first and second based stations by which the WCD was not currently being served. The transmission could include information not related to the first and second reports, for example identification information corresponding to the WCD, a listing of services requested by the WCD, or other information related to the operation of the WCD and/or signals received by the WCD.

The wireless network may receive the first and second reports and determine based on these reports whether the WCD should be served by the first base station or the second base station. In an example, the wireless network makes this determination based on a comparison of the measured power indicated by the first report to the measured power indicated by the second report (which is offset by the bias value). If the first report indicates the greater measured power, the wireless network may select the base station corresponding to the first report and instruct the WCD to use that selected base station. If the second report indicates the greater measured power (for example, because of the offset value), the wireless network may select the base station corresponding to the second report and instruct the WCD to use that selected base station. The wireless network's selection could also include other factors, such as the respective loads of the first and second base stations, the respective services available through the first and second base stations, and/or other factors

5. Conclusion

Various example embodiments have been described above. Those skilled in the art will understand, however, that changes and modifications may be made to those examples without departing from the scope of the claims.

What is claimed is:

1. A method, comprising:
   a wireless communication device (WCD) measuring powers of radio frequency signals received by the WCD, wherein the radio frequency signals received by the WCD include at least a first radio frequency signal transmitted by a first base station of a wireless network and a second radio frequency signal transmitted by a second base station of the wireless network, wherein the first base station transmits radio frequency signals at a higher power than the second base station;
   the WCD calculating a bias value based on at least one of the measured powers of the first radio frequency signal and second radio frequency signal;
   the WCD generating a first report indicative of the measured power of one of the first and second radio frequency signals;
   the WCD generating a second report indicative of the measured power of the other of the first and second radio frequency signals offset by the bias value; and
   the WCD transmitting the first and second reports to the wireless network.

2. The method of claim 1, wherein the first base station provides wireless coverage in a macrocell and the second base station provides wireless coverage in a femtocell or picocell.

3. The method of claim 1, wherein the radio frequency signals received by the WCD further include one or more additional radio frequency signals transmitted by one or more additional base stations of the wireless network, and wherein the measured power of the first radio frequency signal is greater than the measured powers of the one or more additional radio frequency signals.

4. The method of claim 1, wherein the wireless network is configured to select a serving base station for the WCD from among the first and second base stations based on the first and second reports.

5. The method of claim 1, wherein calculating a bias value based on at least one of the measured powers of the first radio frequency signal and second radio frequency signal comprises (i) using the measured power of the first radio frequency signal as an input value to a function to obtain an output value and (ii) calculating the bias value based at least on the output value, wherein the function provides output values that decrease monotonically with increasing input values.

6. The method of claim 5, wherein the measured power of the first radio frequency signal is a Reference Signal Received Power (RSRP) of the first radio frequency signal.

7. The method of claim 1, wherein calculating a bias value based on at least one of the measured powers of the first radio frequency signal and second radio frequency signal comprises (i) calculating a signal quality of the second radio frequency signal based on the measured power of the second radio frequency signal, (ii) using the calculated signal quality of the second radio frequency signal as an input value to a function to obtain an output value, and (iii) calculating the bias value based at least on the output value, wherein the function provides output values that increase monotonically with increasing input values.

8. The method of claim 7, wherein the signal quality of the second radio frequency signal is a Reference Signal Received Quality (RSRQ) of the second radio frequency signal.

9. A wireless communication device (WCD), comprising:
   a radio frequency transceiver;
   a processor;
   data storage; and
   program instructions stored in the data storage, wherein the program instructions are executable by the processor to cause the WCD to perform functions, the functions comprising:
      measuring powers of radio frequency signals received by the radio frequency transceiver, wherein the radio frequency signals received by the radio frequency transceiver include at least a first radio frequency signal transmitted by a first base station of a wireless network and a second radio frequency transmitted by a second base station of the wireless network, wherein the first base station transmits radio frequency signals at a higher power than the second base station;
      calculating a bias value based on at least one of the measured powers of the first radio frequency signal and second radio frequency signal;
      generating a first report indicative of the measured power of one of the first and second radio frequency signals;
      generating a second report indicative of the measured power of the other of the first and second radio frequency signals offset by the bias value; and
      transmitting the first and second reports to the wireless network.

10. The wireless communication device of claim 9, wherein the functions further comprise:
    selecting a base station from among the first base station and the second base station based on at least the measured power of the first radio frequency signal received from the first base station, the measured power of the radio frequency signal received from the second base station, and the bias value; and
    transmitting one or more messages to the selected base station, wherein the one or more messages request a connection to the wireless network through the selected base station.

11. The wireless communication device of claim 9, wherein calculating a bias value based on at least one of the measured powers of the first radio frequency signal and second radio frequency signal comprises (i) using the measured power of the first radio frequency signal as an input value to a function to obtain an output value, wherein the measured power of the first radio frequency signal is a Reference Signal Received Power (RSRP) of the first radio frequency signal; and (ii) calculating the bias value based at least on the output value, wherein the function provides output values that decrease monotonically with increasing input values.

12. The wireless communication device of claim 9, wherein calculating a bias value based on at least one of the measured powers of the first radio frequency signal and second radio frequency signal comprises (i) calculating a signal quality of the second radio frequency signal based on the measured power of the second radio frequency signal; (ii) using the calculated signal quality of the second radio frequency signal as an input value to a function to obtain an output value, wherein the signal quality of the second radio frequency signal is a Reference Signal Received Quality (RSRQ) of the second radio frequency signal; and (iii) calculating the bias value based at least on the output value, wherein the function provides output values that increase monotonically with increasing input values.

* * * * *